United States Patent
Reyes Lozano

(10) Patent No.: US 12,400,390 B2
(45) Date of Patent: Aug. 26, 2025

(54) SPLIT-BASED TREES FOR RAY TRACING

(71) Applicant: Advanced Micro Devices, Inc., Santa Clara, CA (US)

(72) Inventor: Leo Hendrik Reyes Lozano, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 387 days.

(21) Appl. No.: 17/974,303

(22) Filed: Oct. 26, 2022

(65) Prior Publication Data

US 2024/0144580 A1    May 2, 2024

(51) Int. Cl.
*G06T 15/06* (2011.01)
*G06T 15/10* (2011.01)

(52) U.S. Cl.
CPC .............. *G06T 15/06* (2013.01); *G06T 15/10* (2013.01)

(58) Field of Classification Search
None
See application file for complete search history.

(56) References Cited

U.S. PATENT DOCUMENTS

| | | | |
|---|---|---|---|
| 8,817,026 B1* | 8/2014 | Zimmerman | G06T 15/06 345/426 |
| 2021/0390758 A1* | 12/2021 | Muthler | G06T 15/06 |
| 2023/0252717 A1* | 8/2023 | Mcallister | G06T 15/005 345/426 |
| 2023/0252718 A1* | 8/2023 | Fenney | G06T 15/06 |

OTHER PUBLICATIONS

Stich, M., et. al., "Spatial Splits in Bounding Volume Hierarchies", NVIDIA Research, 7 pgs., downloaded from https://www.google.com/url?sa=t&rct=j&q=&esrc=s&source=web&cd=&ved=2ahUKEwiTzLWP6f36AhU5mokEHd5SAZAQFnoECAcQAQ&url=https%3A%2F%2Fwww.nvidia.in%2Fdocs%2FI0%2F77714%2Fsbvh.pdf&usg=AOvVaw1Z01WTait_DiS_eYrOwuVx on Oct. 26, 2022.

* cited by examiner

*Primary Examiner* — James A Thompson
(74) *Attorney, Agent, or Firm* — Volpe Koenig

(57) ABSTRACT

Devices and methods are provided for generating an accelerated data structure for ray tracing which include generating a first splitting plane at a first location of a space comprising objects represented by geometry, constructing a first level of an accelerated data structure based on portions of the geometry, straddling the first splitting plane, which are classified as located on opposing sides of the first splitting plane, after constructing the first level of the accelerated data structure, generating a second splitting plane at a second location, different from the first location, of the space and constructing a second level of the accelerated data structure based on portions of the geometry, straddling the second splitting plane, which are classified as located on opposing sides of the second splitting plane.

18 Claims, 7 Drawing Sheets

SPLIT-BASED TREES FOR RAY TRACING

BACKGROUND

Ray tracing is a type of graphics rendering technique in which simulated rays of light are cast to test for object intersection and pixels are illuminated and colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein.

DETAILED DESCRIPTION

Figure 1:
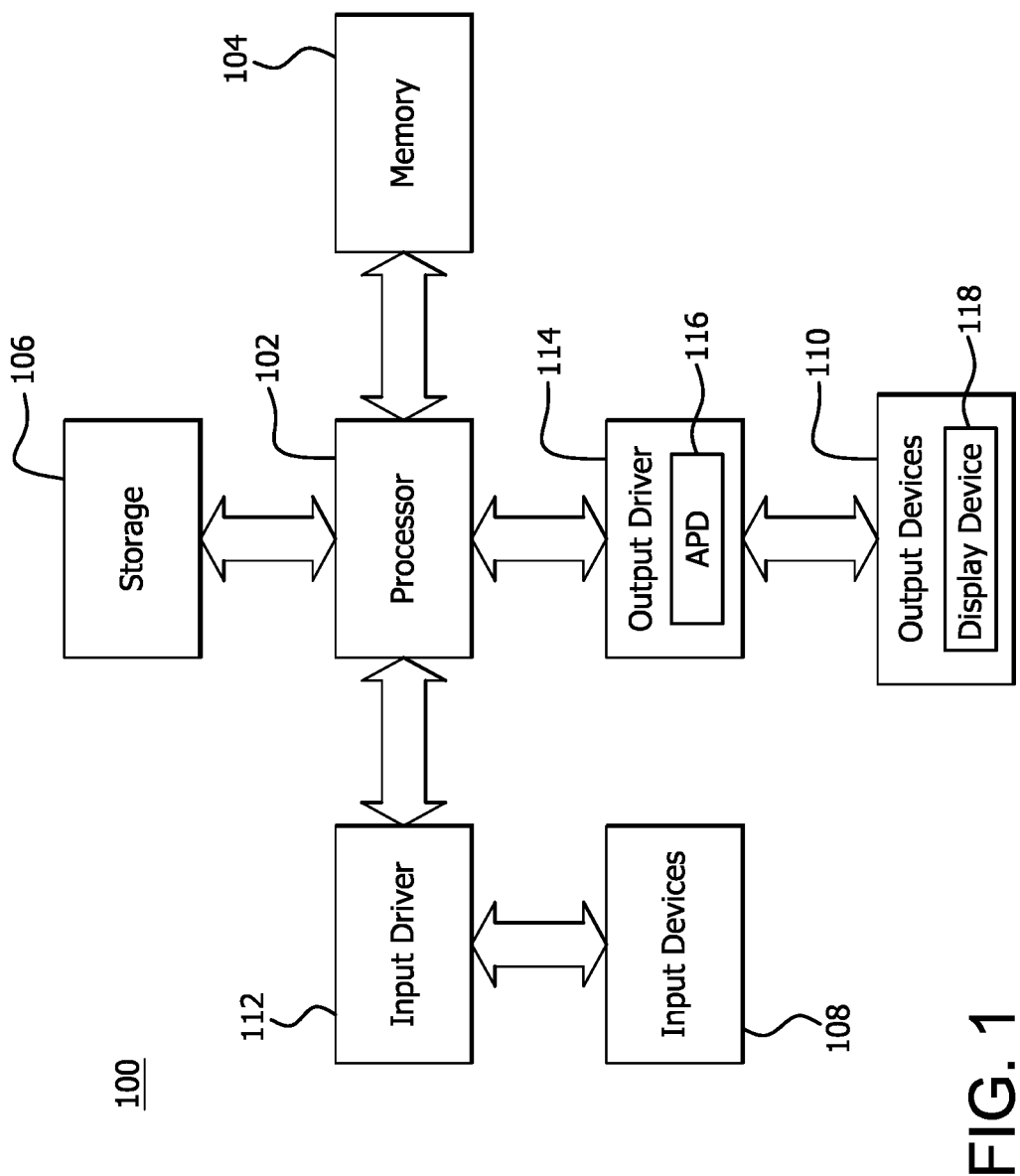
FIG. 1 is a block diagram of an example device in which one or more features of the disclosure can be implemented.

Typically, a scene (e.g., objects in a scene) is represented by geometry, such as a large number of geometric shapes (e.g., polygons) or procedurally-generated primitives. For simplified explanation purposes, in examples described herein, triangles are used as examples of the geometry (e.g., geometric shapes and primitives) used to represent a scene. Features of the present disclosure can be implemented, however, using any geometric shapes or primitives to represent objects in a scene.

Ray tracing renders a three dimensional (3D) scene by casting (i.e. shooting) a simulated light ray from a point of origin in a 3D space of a scene and testing whether the ray intersects an object (e.g., a triangle representing a portion of an object) in a scene. Ray tracing can be used to determine the presence of objects and a variety of characteristics of objects in a scene, such as for example, the distance between an intersection and a point of origin (e.g., the distance between an object and the point of origin), the location (in a 3D space) of objects in a scene, the physical characteristics (e.g., size, shape, luminance and color) of objects in a scene, and whether light is being obstructed (e.g., a first object, located between a second object and a light source, casts a shadow on the second object).

Separate rays can be cast on each triangle in a scene to determine the presence and characteristics of objects. However, each ray intersection test is complex and expensive in terms of processing resources. Accordingly, acceleration hierarchical data structures (e.g., bounding volume hierarchy) are used to implement ray tracing more efficiently to make accurate determinations.

For example, in a bounding volume hierarchy (BVH) accelerated data structure, numbers of triangles are grouped together (e.g., by a bounding box) and multiple hierarchies (i.e., hierarchy levels) of triangles are created. The BVH data structure allows the number of ray-triangle intersections to be reduced as compared with a scenario in which no such data structure were used and therefore all triangles in a scene would have to be tested against the ray. Specifically, if a ray does not intersect a particular bounding box, and that bounding box bounds a large number of triangles, then each triangle in that box can be eliminated from the test. Thus, a ray intersection test is performed as a sequence of tests of the ray against axis-aligned bounding boxes, followed by tests against triangles.

In a simplified example, if 4 triangles are grouped together for testing, a hierarchy tree can be created which includes 3 separate hierarchical levels. In this example, the first level includes the group of 4 triangles. The second level includes 2 separate groups of 2 triangles branched off of the group of 4 triangles, with 1 group represented by 2 of the 4 triangles and the other group represented by the 2 other triangles. The third level includes the 4 individual triangles, with the first and second triangles branching off of the first group of triangles in the second level and the third and fourth triangles branching off of the second group of triangles in the second level. A ray is first tested (e.g., cast) between a point of origin (e.g., in a 3D space) and the group of 4 triangles (i.e., the first level). When there is no hit (i.e., no object detected), then no further ray tracing is performed on the group of 4 triangles by intersecting the bounding box of those 4 triangles. When there is a hit (i.e., an object is detected), the testing proceeds to the second level. The first group in the second level is then tested. If there is a hit on the first group in the second level, traversal continues to the third level and the process repeats. When a hit occurs on one of the nodes (e.g., a triangle) in the third level, then traversal is either aborted or continues to other nodes in which an object is detected. For example, traversal is aborted when an occluded mode is used. Alternatively, traversal continues to other nodes in which an object is detected (e.g., if a ray hits both the first and second group) when a closest hit mode is used.

Accordingly, a determination of which triangles represent an object is made without testing the second group of triangles in the second level or the third and fourth triangles in the third level. In this example, the determination is made using 4 tests (i.e., 2 ray/box tests and 2 ray/triangle tests) for 4 triangles. However, as can be appreciated, when a larger group of triangles is tested using a bounding volume hierarchy, many more groups of triangles may be eliminated from testing. Accordingly, as the number of triangles in a testing region increases, a bounding volume hierarchy reduces the total number of tests to be performed for the region (e.g., 10 tests for 1000 triangles) and ray tracing is implemented more efficiently while maintaining accuracy.

Despite the use of acceleration structures (e.g., BVHs) to implement ray tracing, overlapping bounding boxes in the BVH cause multiple branches of the tree to be traversed, negatively impacting the overall performance. The negative impact is proportional to the area of the overlapping regions (e.g., overlapping bounding boxes). The larger the overlap, the more the performance degrades. The performance is even more negatively impacted when overlaps occur closer to the top of the hierarchy tree.

Some conventional ray tracing techniques include splitting geometry (e.g., triangles) during a pre-processing step (prior to constructing the BVH tree) and the split triangles are then provided to a BVH algorithm hoping to improve the quality of tree. However, the triangles are not split such that overlapping of bounding boxes is prevented. In fact, in some conventional techniques, the splitting of triangles, prior to constructing the BVH tree, negatively impacts the overall performance of tracing the tree.

Other conventional ray tracing techniques select locations of multiple splitting planes (representing planes in a 3D space) prior to constructing the BVH tree. However, after the location of the splitting planes are determined, portions of the geometry (e.g., triangles) which straddle the splitting planes are classified to one side of the plane (e.g., plane) or the other side of the plane by their centroids. Accordingly, the straddling geometry causes overlaps between nodes on the same level of the tree. That is, for example, two different nodes on a same level of the tree include the same data (i.e., the overlapping data) representing a triangle which straddles a splitting plane. In addition, these conventional techniques are limited to determining the locations of the splitting planes based on calculations of Morton codes (e.g., mapping multidimensional data to one dimension by interleaving the binary representations of coordinate values) or surface area heuristics (e.g., SAH).

Features of the present disclosure provide devices and methods for efficiently performing an efficient ray tracing procedure by generating splitting planes of a space during the construction (i.e., concurrently with the construction) of the hierarchy tree (e.g., BVH tree) to prevent overlapping geometry (e.g., portions of a split triangle) at the upper levels of the tree. For example, a first splitting plane is generated in a space and a first level of a BVH tree is constructed based on portions of geometry (e.g., triangles) straddling the first splitting plane. Then, after the first level of the tree is constructed, a second splitting plane is generated at a different location of the space and a second level of a BVH tree is constructed based on portions of geometry (e.g., triangles) straddling the second splitting plane.

Portions of the geometry (e.g., portions of the geometric primitives) straddling the splitting planes are classified as portions located on one side or the opposing side of a corresponding splitting plane such that overlapping geometry (e.g., portions of a split triangle) is prevented from one or more upper levels of the tree. Accordingly, a single branch of the tree is traversed at the upper levels, which significantly reduces redundant testing (i.e., traversals).

A selection is made between continuing to generate additional splitting plane or stopping the generation of any additional splitting planes based on one or more memory usage factors which are used to determine and limit the amount of memory used to store data for the nodes of the BVH tree.

Features of the present disclosure include generating splitting planes at different random locations of a space (e.g., any location of a bounding box) to prevent overlapping geometry (e.g., portions of a split triangle) at the upper levels of the tree. While locations of splitting planes can be selected based on calculations of Morton codes or SAHs, a location of a splitting plane can also be selected without using these calculations or SAHs. For example, a location of a splitting plane can be selected as a simple median splitting plane (e.g., spatial median). Accordingly, features of the present disclosure are able to more efficiently construct the BVH tree and perform ray tracing than conventional techniques which rely on Morton codes or SAHs.

Features of the present disclosure can also be implemented universally for any hierarchical data structure algorithms to prevent overlapping geometry (e.g., portions of a split triangle) at the upper levels of the tree.

A method for generating an accelerated data structure for ray tracing is provided, which comprises generating a first splitting plane at a first location of a space comprising objects represented by geometry, constructing a first level of an accelerated data structure based on portions of the geometry, straddling the first splitting plane, which are classified as located on opposing sides of the first splitting plane, after constructing the first level of the accelerated data structure, generating a second splitting plane at a second location, different from the first location, of the space and constructing a second level of the accelerated data structure based on portions of the geometry, straddling the second splitting plane, which are classified as located on opposing sides of the second splitting plane.

A processing device used for generating an accelerated data structure for ray tracing is provided, which comprises memory and a processor. The processor is configured to generate a first splitting plane at a first location of a space comprising objects represented by geometry, construct a first level of an accelerated data structure based on portions of the geometry, straddling the first splitting plane, which are classified as located on opposing sides of the first splitting plane, after the first level of the accelerated data structure is constructed, generate a second splitting plane at a second location, different from the first location, of the space and construct a second level of the accelerated data structure based on portions of the geometry, straddling the second splitting plane, which are classified as located on opposing sides of the second splitting plane.

A non-transitory computer-readable storage medium is provided which comprises instructions for causing a computer to execute a method of generating an accelerated data structure for ray tracing comprising generating a first splitting plane at a first location of a space comprising objects represented by geometry, constructing a first level of an accelerated data structure based on portions of the geometry, straddling the first splitting plane, which are classified as located on opposing sides of the first splitting plane, after constructing the first level of the accelerated data structure, generating a second splitting plane at a second location, different from the first location, of the space and constructing a second level of the accelerated data structure based on portions of the geometry, straddling the second splitting plane, which are classified as located on opposing sides of the second splitting plane.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
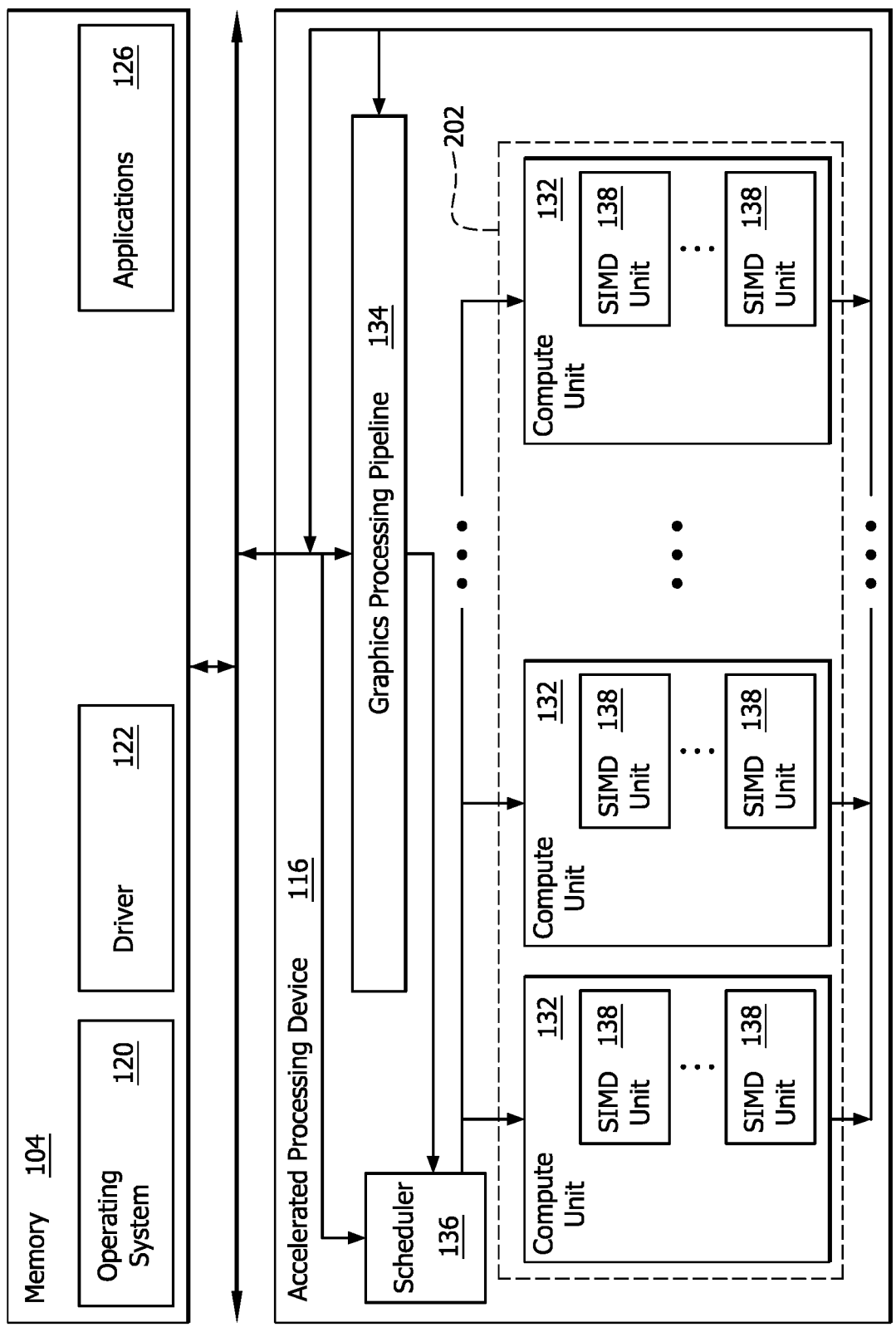
FIG. 2 is a block diagram of the device, illustrating additional details related to execution of processing tasks on the accelerated processing device of FIG. 1, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 (collectively "compute units 202") that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" (also "waves") on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Figure 3:
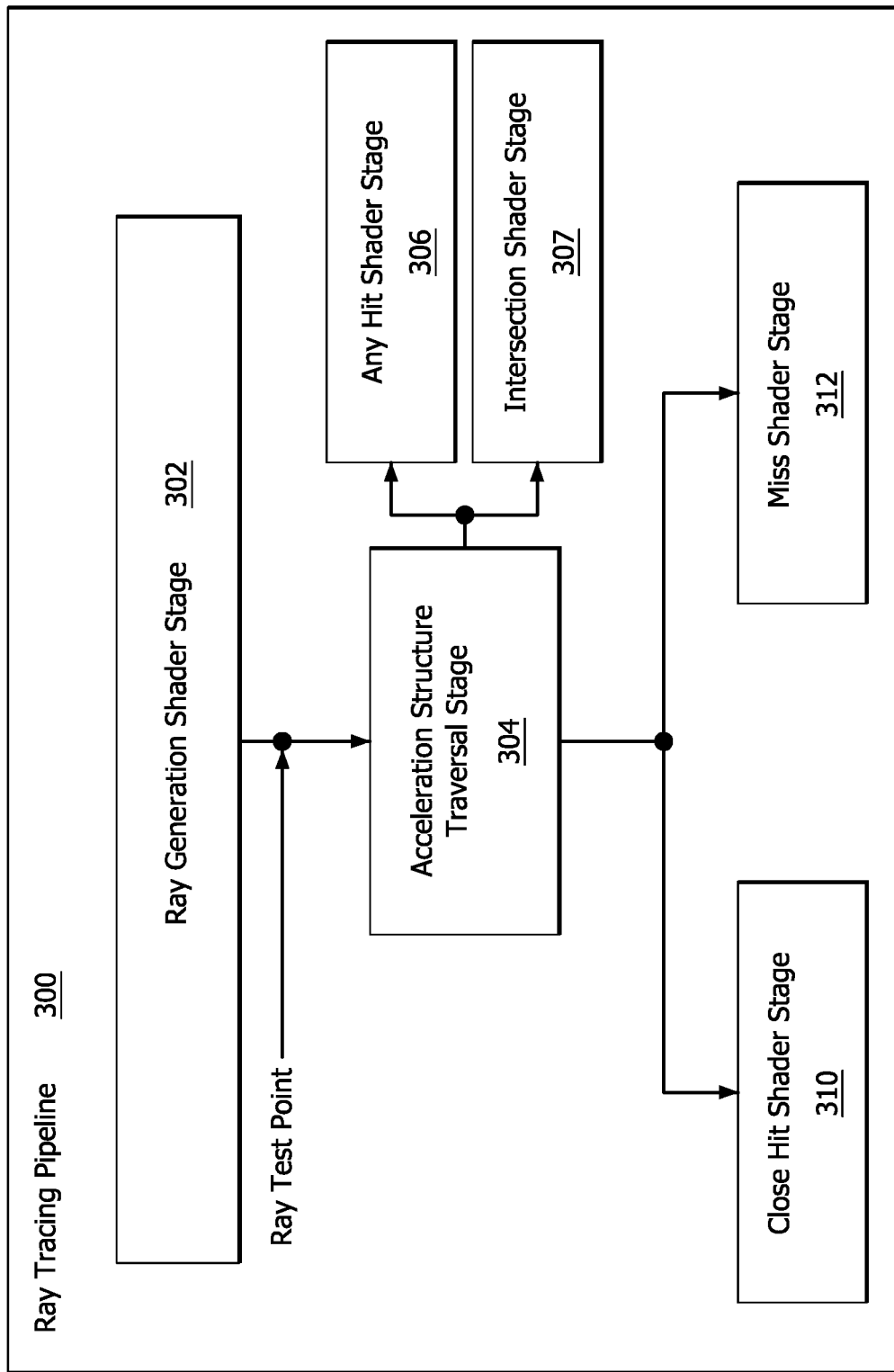
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, intersection shader 307, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is pre-compiled by an application compiler and/or compiled by the driver 122). The acceleration structure traversal stage 304 performs the ray intersection test to determine whether a ray hits a triangle. The other programmable shader stages (ray generation shader 302, any hit shader 306, closest hit shader 310, miss shader 312) are implemented as shader programs that execute on the SIMD units 138. The acceleration structure traversal stage is implemented in software (e.g., as a shader program executing on the SIMD units 138), in hardware, or as a combination of hardware and software. The ray tracing pipeline 300 may be orchestrated partially or fully in software or partially or fully in hardware, and may be orchestrated by the processor 102, the scheduler 136, by a combination thereof, or partially or fully by any other hardware and/or software unit. In examples, traversal through the ray tracing pipeline 300 is performed partially or fully by the scheduler 136, either autonomously or under control of the processor 102, or partially or fully by a shader program (such as a bounding volume hierarchy traversal shader program) executing on one or more of the SIMD units 138. In some examples, testing a ray against boxes and triangles (inside the acceleration structure traversal stage 304) is hardware accelerated (meaning that a fixed function hardware unit performs the steps for those tests). In other examples, such testing is performed by software such as a shader program executing on one or more SIMD units 138. Herein, where the phrase "the ray tracing pipeline does [a thing]" is used, this means that the hardware and/or software that implements the ray tracing pipeline 300 does that thing.

The ray tracing pipeline 300 operates in the following manner. A ray generation shader 302 is executed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects within the scene, and tests the ray against triangles in the scene. During this traversal, for triangles that are intersected by the ray, the ray tracing pipeline 300 triggers execution of an any hit shader 306 and/or an intersection shader 307 if those shaders are specified by the material of the intersected triangle. Note that multiple triangles can be intersected by a single ray. It is not guaranteed that the acceleration structure traversal stage will traverse the acceleration structure in the order from closest-to-ray-origin to farthest-from-ray-origin. The acceleration structure traversal stage 304 triggers execution of a closest hit shader 310 for the triangle closest to the origin of the ray that the ray hits, or, if no triangles were hit, triggers a miss shader.

Note, it is possible for the any hit shader 306 or intersection shader 307 to "reject" an intersection from the acceleration structure traversal stage 304, and thus the acceleration structure traversal stage 304 triggers execution of the miss shader 312 if no intersections are found to occur with the ray or if one or more intersections are found but are all rejected by the any hit shader 306 and/or intersection shader 307. An example circumstance in which an any hit shader 306 may "reject" a hit is when at least a portion of a triangle that the acceleration structure traversal stage 304 reports as being hit is fully transparent. Because the acceleration structure traversal stage 304 only tests geometry, and not transparency, the any hit shader 306 that is invoked due to an intersection with a triangle having at least some transparency may determine that the reported intersection should not count as a hit due to "intersecting" a transparent portion of the triangle. A typical use for the closest hit shader 310 is to color a ray based on a texture for the material. A typical use for the miss shader 312 is to color a ray with a color set by a skybox. It should be understood that the shader programs defined for the closest hit shader 310 and miss shader 312 may implement a wide variety of techniques for coloring ray and/or performing other operations.

A typical way in which ray generation shaders 302 generate rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel.

It is possible for any of the any hit shader 306, intersection shader 307, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray intersects an object is referred to herein as a "ray intersection test." The ray intersection test involves shooting a ray from an origin and determining whether the ray intersects a triangle and, if so, what distance from the origin the triangle intersection is at. For efficiency, the ray tracing test uses a representation of space referred to as a bounding volume hierarchy. This bounding volume hierarchy is the "acceleration structure" referred to elsewhere herein. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent mutually exclusive axis aligned bounding boxes that subdivide the entire region. Each of those two children has two child nodes that represent axis aligned bounding boxes that subdivide the space of their parents, and so on. Leaf nodes represent a triangle or other geometry against which a ray intersection test can be performed.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
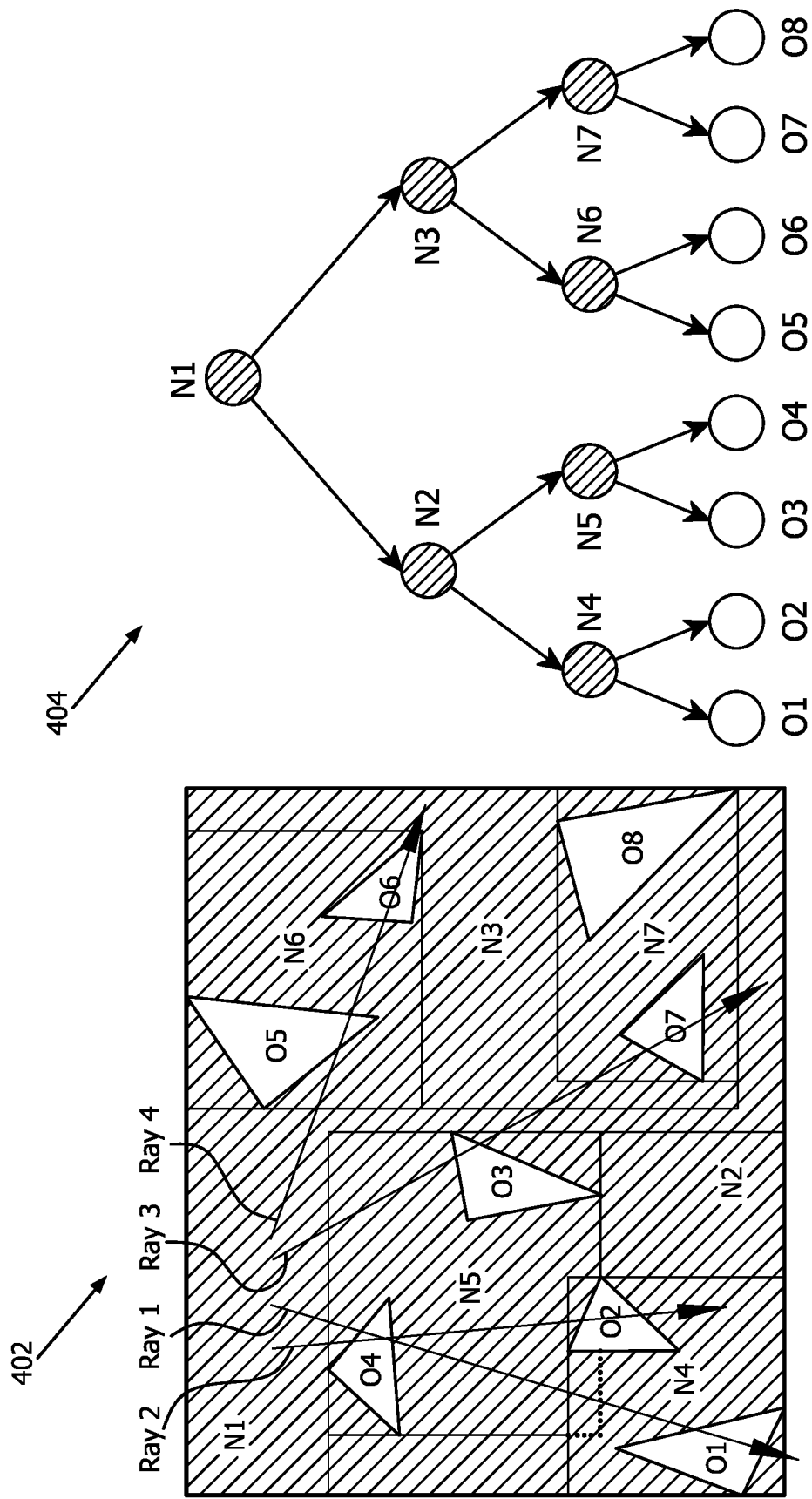
FIG. 4 is an illustration of a bounding volume hierarchy, according to an example.

FIG. 4 is an illustration of an example bounding volume hierarchy. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the test for that non-leaf node fails. In an example, the ray intersects $O_5$ but no other triangle. The test would test against $N_1$, determining that that test succeeds. The test would test against $N_2$, determining that the test fails (since $O_5$ is not within $N_1$). The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails. Instead of testing 8 triangle tests, two triangle tests ($O_5$ and $O_6$) and five box tests ($N_1$, $N_2$, $N_3$, $N_6$, and $N_7$) are performed.

The ray tracing pipeline 300 casts rays to detect whether the rays hit triangles and how such hits should be shaded. Each triangle is assigned a material, which specifies which closest hit shader should be executed for that triangle at the closest hit shader stage 310, as well as whether an any hit shader should be executed at the any hit shader stage 306, whether an intersection shader should be executed at the intersection shader stage 307, and the specific any hit shader and intersection shader to execute at those stages if those shaders are to be executed.

Thus, in shooting a ray, the ray tracing pipeline 300 evaluates intersections detected at the acceleration structure traversal stage 304 as follows. If a ray is determined to intersect a triangle, then if the material for that triangle has at least an any hit shader or an intersection shader, the ray tracing pipeline 300 runs the intersection shader and/or any hit shader to determine whether the intersection should be deemed a hit or a miss. If neither an any hit shader or an intersection shader is specified for a particular material, then an intersection reported by the acceleration structure traversal 304 with a triangle having that material is deemed to be a hit.

Some examples of situations where an any hit shader or intersection shader do not count intersections as hits are now provided. In one example, if alpha is 0, meaning fully transparent, at the point that the ray intersects the triangle, then the any hit shader deems such an intersection to not be a hit. In another example, an any hit shader determines that the point that the ray intersects the triangle is deemed to be at a "cutout" portion of the triangle (where a cutout "cuts out" portions of a triangle by designating those portions as portions that a ray cannot hit), and therefore deems that intersection to not be a hit.

Once the acceleration structure has been fully traversed, the ray tracing pipeline 300 runs the closest hit shader 310 on the closest triangle determined to hit the ray. As with the any hit shader 306 and the intersection shader 307, the closest hit shader 310 to be run for a particular triangle is dependent on the material assigned to that triangle.

In sum, the ray tracing pipeline 300 traverses the acceleration structure 304, determining which triangle is the closest hit for a given ray. The any hit shaders and intersection shaders evaluate intersections—potential hits—to determine if those intersections should be counted as actual hits. Then, for the closest triangle whose intersection is counted as an actual hit, the ray tracing pipeline 300 executes the closest hit shader for that triangle. If no triangles count as a hit, then the ray tracing pipeline 300 executes the miss shader for the ray.

Operation of the ray tracing pipeline 300 is now discussed with respect to the example rays 1-4 illustrated in FIG. 4. For each of the example rays 1-4, the ray tracing pipeline 300 determines which triangles those rays intersect. The ray tracing pipeline 300 executes appropriate any hit shaders 306 and/or intersection shaders 307, as specified by the materials of the intersected triangles, in order to determine the closest hit that does not miss (and thus the closest-hit triangle). The ray tracing pipeline 300 runs the closest hit shader for that closest-hit triangle.

In an example, for ray 1, the ray racing pipeline 300 runs the closest hit shader for $O_4$ unless that triangle had an any hit shader or intersection shader that, when executed, indicated that ray 1 did not hit that triangle. In that situation, the ray tracing pipeline 300 would run the closest hit shader for $O_1$ unless that triangle had an any hit shader or intersection shader indicating that triangle was not hit by ray 1, and in that situation, the ray tracing pipeline 300 would execute a miss shader 312 for ray 1. Similar operations would occur for rays 2, 3, and 4. For ray 2, the ray tracing pipeline 300 determines that intersections occur with $O_2$ and $O_4$, executes an any hit and/or an intersection shader for those triangles if specified by the material, and runs the appropriate closest hit or miss shader. For rays 3 and 4, the ray tracing pipeline 300 determines intersections as shown (ray 3 intersects $O_3$ and $O_7$ and ray 4 intersects $O_5$ and $O_6$), executes appropriate any hit and an/or intersection shaders, and executes appropriate closest hit or miss shaders based on the results of the any hit and/or intersection shaders.

As described above, features of the present disclosure efficiently perform ray tracing by generating splitting planes of a space during the construction (i.e., concurrently with the construction) of the hierarchy tree (e.g., BVH tree) to prevent overlapping geometry (e.g., portions of a split triangle) at the upper levels of the tree.

Figure 5:
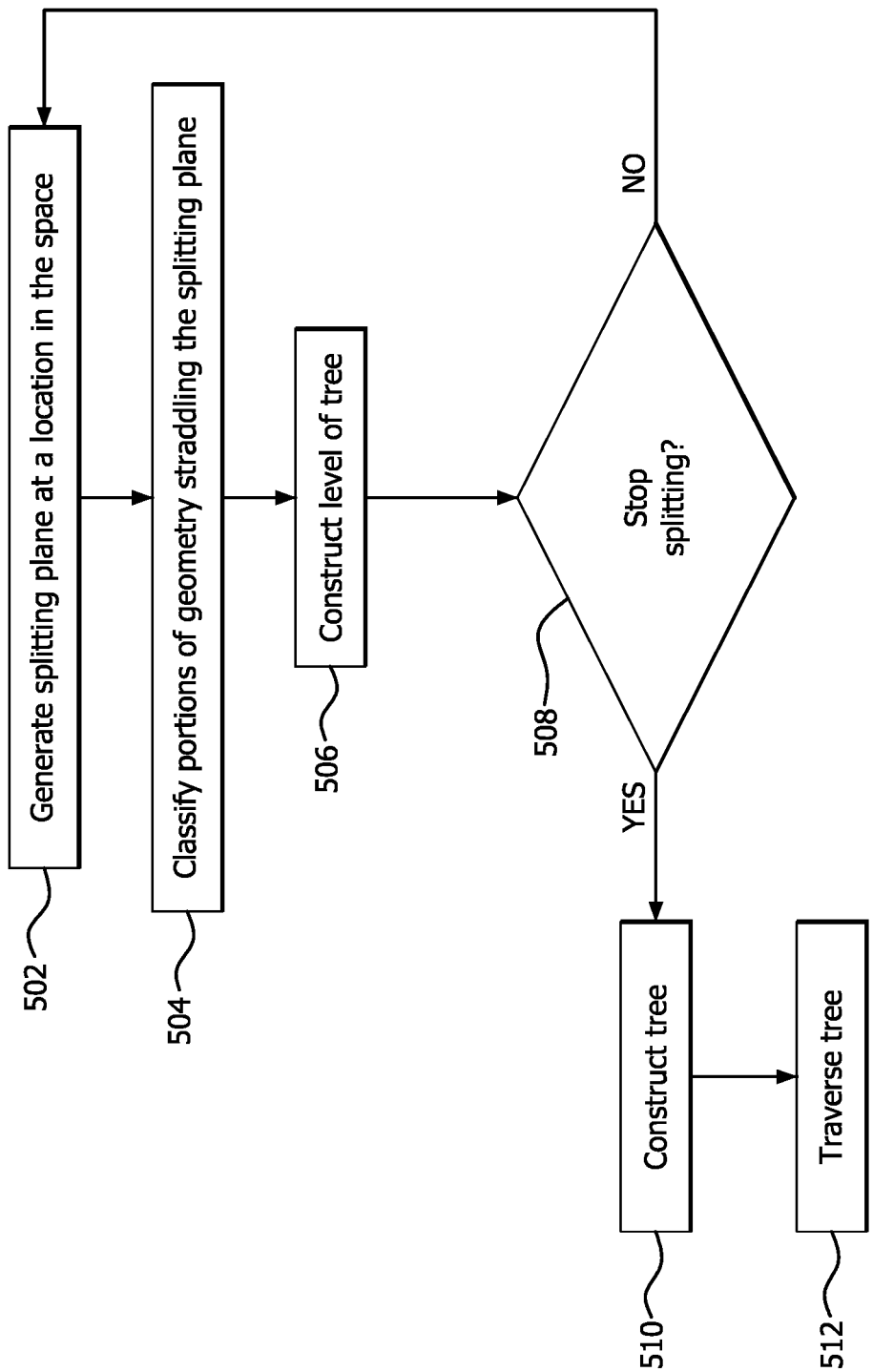
FIG. 5 is a flow diagram illustrating an example method of generating a BVH tree for ray tracing according to features of the present disclosure.

FIG. 5 is a flow diagram illustrating an example method 500 of generating a BVH tree for ray tracing according to features of the present disclosure. The example method 500 is described along with the illustration shown in FIGS. 6 and 7.

Figure 6:
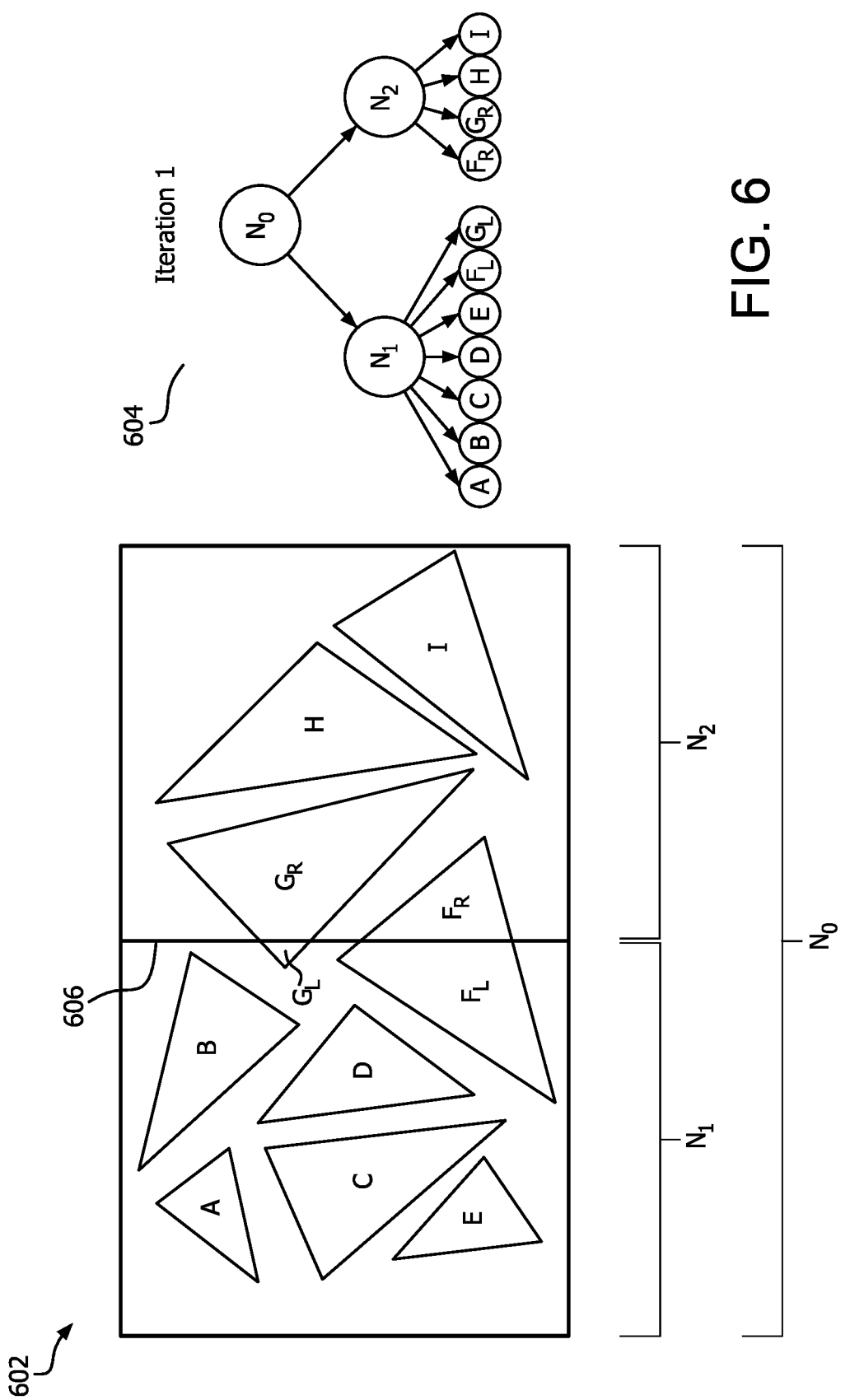
FIG. 6 is an illustration of an example construction of a BVH based on a splitting plane according to features of the present disclosure.
Figure 7:
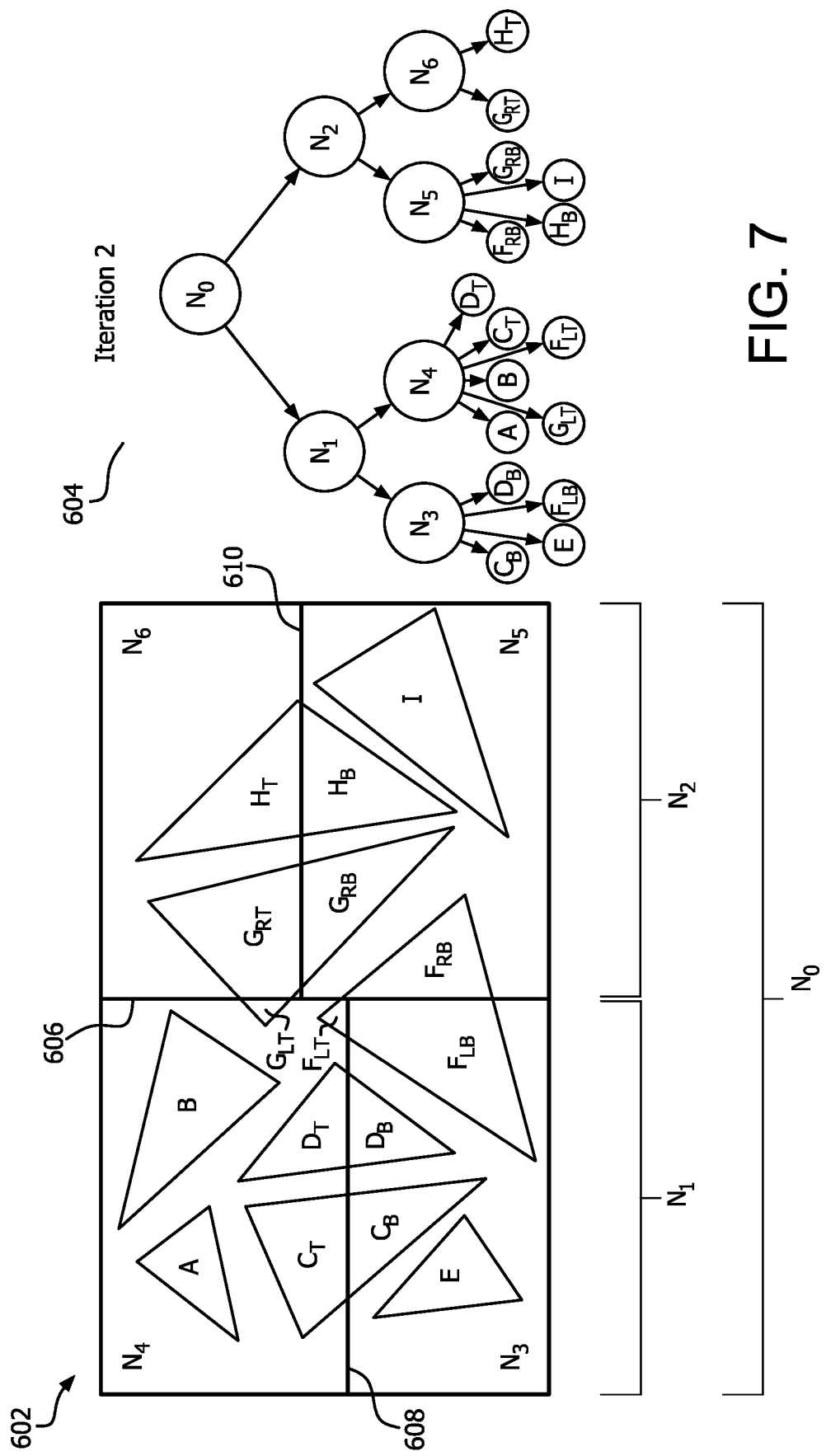
FIG. 7 is an illustration of an example construction of an additional level of the BVH tree shown in FIG. 6 based on additional splitting planes according to features of the present disclosure.

FIG. 6 is an illustration of an example construction of a BVH based on a splitting plane according to features of the present disclosure. FIG. 7 is an illustration of an example construction of an additional level of the BVH tree shown in FIG. 6 based on additional splitting planes according to features of the present disclosure. For simplicity, the hierarchy in FIGS. 6 and 7 is shown in 2D. However, extension to 3D is simple, and it should be understood that the tests described herein would generally be performed in three dimensions. The spatial representation 602 of the BVH, is illustrated on the left side of FIGS. 6 and 7 and the tree representation 604 of the BVH is illustrated on the right side of FIGS. 6 and 7.

The spatial representation 602 of the BVH includes a plurality of triangles (A-I). The size, shape, location and number of triangles shown in FIGS. 6 and 7 is merely an example. Features of the present disclosure can be implemented for any number of geometric shapes or primitives at any number of locations.

As shown in block 502 in FIG. 5, the method 500 includes generating a splitting plane at a location in a space. The splitting plane is, for example, generated at a random location of a space (e.g., any location of a bounding box). For example, as shown in FIG. 6, splitting plane 606 is generated in space 602 (i.e., in the outer bonding box).

Although the first splitting plane 606 shown in FIG. 6 is a vertical plane in the middle of the spatial representation 602, the orientation and location of the first splitting plane 606 is merely an example. A first splitting plane can be generated at any random location in a space and have any orientation (e.g., vertical, horizontal, diagonal).

A splitting plane can be generated as a simple median splitting plane (e.g., located at a spatial median of a bounding box). A splitting plane can also be generated at a location determined by calculations of Morton codes or SAHs. However, splitting planes can be generated according to features of the present disclosure without using Morton codes or SAHs to more efficiently construct a BVH tree and perform ray tracing than conventional techniques which rely on Morton codes or SAHs.

As shown at block 504 in FIG. 5, the method 500 includes classifying portions of geometry straddling the splitting plane as located on one side or the opposing side of the splitting plane. For example, as shown in FIG. 6, triangles F and G straddle splitting plane 606. As shown in the spatial representation 602, a first portion of triangle F, located to the left (L) of the splitting plane 606, is classified as portion $F_L$ (corresponding to Node $N_1$) and a second portion of triangle F, located to the opposite side (i.e., the right (R) side) of the splitting plane 606, is classified as portion $F_R$ (corresponding to Node $N_2$). A first portion of triangle G, located to the left of the splitting plane 606, is classified as portion $G_L$ (corresponding to Node $N_1$) and a second portion of triangle G, located to the opposite side (i.e., the right side) of the splitting plane 606, is classified as portion $G_R$ (corresponding to Node $N_2$).

Because the remaining triangles A-E, H and I do not straddle the splitting plane 606, these triangles are simply classified as being located on either the left side (corresponding to Node $N_1$) or being located on the right side Node $N_2$ (corresponding to Node $N_2$). That is, triangles A-E are classified as located on the left side (corresponding to Node $N_1$) of the splitting plane 606. Triangles H and I are classified as located on the right side (corresponding to Node $N_2$) of the splitting plane 606.

As shown at block 506 in FIG. 5, a level of the BVH tree is constructed based on the classification. For example, as shown in the tree representation 604, a level of the BVH tree is generated with Node No representing the data for each of the triangles (A-I) in the spatial representation 602, Node $N_1$ representing the data for each of the triangles (A-E) and portions of triangles ($F_L$ and $G_L$) classified as falling on the left side of the splitting plane 606 and Node $N_2$ representing the data for each of the triangles (H and I) and portions of triangles ($F_R$ and $G_R$) classified as falling on the right side of the splitting plane 606. Accordingly, overlapping geometry (e.g., portions of a split triangle) is prevented from the level of the tree which includes Node $N_1$ and Node $N_2$.

As shown at decision block 508 in FIG. 5, the method 500 includes determining whether or not to stop the generation of any additional splitting planes. That is, the method 500 includes selecting between continuing to generate an additional splitting plane or stopping the generation of any additional splitting planes based on one or more memory usage factors.

The memory usage factors include information used to determine or limit an amount of memory to store the data for the nodes of the BVH. The factors include, for example, a split budget, a tree depth, a number of geometric shapes or primitives, or one or more heuristics (e.g., SAH) which indicate that additional splits will be inefficient.

Selecting between stopping and continuing the generation of additional splitting planes is determined, for example, based on a splitting budget. For example, the current number of splitting planes is compared to a splitting budget threshold (i.e., threshold number of splitting planes). When the current number of splitting planes is equal to or greater than the splitting budget threshold, the splitting of the BVH tree is stopped. When the current number of splitting planes is less than the splitting planes budget threshold, one or more additional splitting planes are generated.

Selecting between stopping and continuing the generation of additional splitting planes is determined, for example, based on a tree level depth. For example, the current number of levels in the tree (e.g., caused by the splitting of triangles) is compared to a tree level depth threshold (i.e., threshold number of splits). When the current number of levels in the tree is equal to or greater than the tree level depth threshold, the splitting of the BVH tree is stopped. When the current number of levels in the tree is less than the tree level depth threshold, one or more additional splitting planes are generated.

Selecting between stopping and continuing the generation of additional splitting planes is determined, for example, based on a total current number of portions of geometry classified due to the splitting planes. For example, the total current number of portions of geometry is compared to a portions threshold. When the current number of portions is equal to or greater than the portions threshold, the splitting of the BVH is stopped. When the current number of portions is less than the portions threshold, one or more additional splitting planes are generated.

When a selection is made to generate additional splitting planes, the method proceeds back to block 502 and one or more additional splitting planes are generated at locations different from the location of the first splitting plane.

For example, as shown in FIG. 7, additional splitting planes 608 and 610 are generated in space 602. The additional splitting planes 608 and 610 can be generated at locations as described above with regard to the first splitting plane 606. For example, the additional splitting planes 608 and 610 can be generated at random locations different from the location of the first splitting plane 606. Also, a single additional splitting plane can be generated for the next level of the tree. For example, a single horizontal splitting plane can be generated in the outer bonding box which intersects the first splitting plane 606. Alternatively, one or more additional splitting planes can also be generated as vertical planes.

A splitting plane can be generated as a simple median splitting plane (e.g., located at a spatial median of a bounding box, such as the bounding box corresponding to Node $N_1$ and the bounding box corresponding to Node $N_2$). Additional splitting planes can also be generated at locations based on calculations of Morton codes or SAHs. However, as described above, splitting planes can be generated according to features of the present disclosure without using Morton codes calculations or SAHs to more efficiently construct a BVH tree and perform ray tracing than conventional techniques which rely on Morton codes or SAHs.

Portions of geometry straddling the additional splitting planes 608 and 610 are then classified as located on one side or the opposing side of the splitting planes 608 and 610 as described above at block 504 in FIG. 5. For example, as shown in the spatial representation 602 in FIG. 7, triangles C, D and F straddle splitting plane 608 and triangles G and H straddle splitting plane 610.

A first portion (i.e., top (T) portion) of triangle C, located above the splitting plane 608, is classified as portion $C_T$ (corresponding to Node $N_4$ as well as Node $N_0$ and Node $N_1$) and a second portion (i.e., bottom (B) portion) of triangle C, located below the splitting plane 608, is classified as portion $C_B$ (corresponding to Node $N_3$ as well as Node No and Node $N_1$).

A first portion (i.e., top portion) of triangle D, located above the splitting plane 608, is classified as portion $D_T$ (corresponding to Node $N_4$ as well as Node No and Node $N_1$) and a second portion (i.e., bottom portion) of triangle D, located below the splitting plane 608, is classified as portion $D_B$ (corresponding to Node $N_3$ as well as Node $N_0$ and Node $N_1$).

A first portion (i.e., top left portion) of triangle F, located above the splitting plane 608 and to the left of splitting plane 606, is classified as portion $F_{LT}$ (corresponding to Node $N_4$ as well as Node $N_0$ and Node $N_1$). A second portion (i.e., bottom left portion) of triangle F, located below the splitting plane 608 and to the left of splitting plane 606, is classified as portion $F_{LB}$ (corresponding to Node $N_3$ as well as Node No and Node $N_1$). A third portion (i.e., bottom right portion) of triangle F, located below the splitting plane 610 and to the right of splitting plane 606, is classified as portion $F_{RB}$ (corresponding to Node $N_5$ as well as Node $N_0$ and Node $N_2$).

A first portion of triangle G, located above the splitting plane 608 and to the left of splitting plane 606, is classified as portion $G_{LT}$ (corresponding to Node $N_4$ as well as Node $N_0$ and Node $N_1$). A second portion of triangle G, located above the splitting plane 610 and to the right of splitting plane 606, is classified as portion $G_{RT}$ (corresponding to Node $N_6$ as well as Node No and Node $N_2$). A third portion of triangle G, located below the splitting plane 610 and to the right of splitting plane 606, is classified as portion GRE (corresponding to Node $N_5$ as well as Node No and Node $N_2$).

A first portion of triangle H, located above the splitting plane 610, is classified as portion $H_T$ (corresponding to Node $N_6$ as well as Node $N_0$ and Node $N_2$) and a second portion of triangle H, located below the splitting plane 610, is classified as portion $H_B$ (corresponding to Node $N_5$ as well as Node $N_0$ and Node $N_2$).

Because the remaining triangles A, B, E and I do not straddle splitting planes 608 or 610, the classification of these triangles remain the same as described above.

A next level of the BVH tree is then constructed based on the classifications. For example, as shown in the tree representation 604 in FIG. 7, a next level of the BVH tree is generated with Node $N_3$ representing the data for triangle E and triangle portions $C_B$, $D_B$ and $F_{LB}$, Node $N_4$ representing the data for triangles A and B and triangle portions $C_T$, $D_T$ and $F_{LT}$ and $G_{LT}$, Node $N_5$ representing the data for triangle I and triangle portions $F_{RB}$, $G_{RB}$ and $H_B$, and Node $N_6$ representing the data for triangle portions, $G_{RT}$ and $H_T$.

Accordingly, overlapping geometry (e.g., portions of a split triangle) is prevented from the next level of the tree which includes nodes $N_3$-$N_6$.

When a selection is made to stop generating additional splitting planes to one or more nodes (bounding boxes), the method proceeds to block 510 and the remainder of the tree is constructed according to conventional construction algorithms. When construction of the tree is completed, the tree (i.e., nodes of the tree) is traversed at block 512. Images of the scene are then provided for display (e.g., on display device 118).

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for rendering graphics using ray tracing, the method comprising:
generating a first splitting plane at a first location of a space comprising objects represented by geometry;

splitting a respective object in the space that straddles the first splitting plane into a first portion and a second portion, wherein the first portion is a new object that contains parts of the respective object that lie on a first side of the first splitting plane and the second portion is a different new object that contains parts of the respective object that lie on a second side of the first splitting plane;

constructing a first level of an accelerated data structure that includes a first node and a second node, wherein the first node includes the first portion of the respective object that straddles the first splitting plane and the second node includes the second portion of the respective objects that straddle the first splitting plane;

after constructing the first level of the accelerated data structure, generating a second splitting plane at a second location, different from the first location of the space;

constructing a second level of the accelerated data structure by applying the second splitting plane to respective objects contained in the first node and the second node; and rendering the objects using the accelerated data structure.

2. The method of claim 1, further comprising generating the first and second splitting planes at different random locations of the space.

3. The method of claim 1, further comprising selecting between generating one or more additional splitting planes and stopping the generating of splitting planes based on one or more memory usage factors.

4. The method of claim 3, further comprising:
when a selection is made to generate one or more additional splitting planes, constructing a next level of the accelerated data structure based on portions of the geometry straddling the one or more additional splitting planes; and
when a selection is made to stop generating splitting planes, constructing a next level of the accelerated data structure without using additional classified portions of straddling geometry.

5. The method of claim 3, wherein the one or more memory usage factors comprises a total number of splitting planes.

6. The method of claim 3, wherein the one or more memory usage factors comprises a number of levels in the accelerated data structure.

7. The method of claim 3, wherein the one or more memory usage factors comprises a number of portions of geometry of a current level of the accelerated data structure.

8. The method of claim 1, further comprising constructing the first level of the accelerated data structure and the second level of the accelerated data structure without overlapping geometry.

9. A processing device used for rendering graphics using tracing, comprising:
memory; and
a processor communicatively coupled to the memory, wherein the processor is configured to:
generate a first splitting plane at a first location of a space comprising objects represented by geometry;
split a respective object in the space that straddles the first splitting plane into a first portion and a second portion, wherein the first portion is a new object that contains parts of the respective object that lie on a first side of the first splitting plane and the second portion is a different new object that contains parts of the respective object that lie on a second side of the first splitting plane;

construct a first level of an accelerated data structure that includes a first node and a second node, wherein the first node includes the first portion of the respective object that straddles the first splitting plane and the second node includes the second portion of the respective objects that straddle the first splitting plane;

after the first level of the accelerated data structure is constructed, generate a second splitting plane at a second location, different from the first location of the space;

construct a second level of the accelerated data structure by applying the second splitting plane to respective objects contained in the first node and the second node; and rendering the objects using the accelerated data structure.

10. The processing device of claim 9, wherein the processor is configured to generate the first and second splitting planes at different random locations of the space.

11. The processing device of claim 9, wherein the processor is configured to select between generating one or more additional splitting planes and stopping the generating of splitting planes based on one or more memory usage factors.

12. The processing device of claim 11, wherein the processor is configured to:
when a selection is made to generate one or more additional splitting planes, construct a next level of the accelerated data structure based on portions of the geometry straddling the one or more additional splitting planes; and
when a selection is made to stop generating splitting planes, construct a next level of the accelerated data structure without using additional classified portions of straddling geometry.

13. The processing device of claim 11, wherein the one or more memory usage factors comprises a total number of splitting planes.

14. The processing device of claim 11, wherein the one or more memory usage factors comprises a number of levels in the accelerated data structure.

15. The processing device of claim 11, wherein the one or more memory usage factors comprises a number of portions of geometry of a current level of the accelerated data structure.

16. The processing device of claim 9, wherein the processor is configured to construct the first level of the accelerated data structure and the second level of the accelerated data structure without overlapping geometry.

17. The processing device of claim 9, further comprising a display device, wherein images, comprising the objects, are provided for display at the display device.

18. A non-transitory computer-readable storage medium having instructions thereon for causing a computer to execute a method for rendering graphics using ray tracing, the method comprising:
generating a first splitting plane at a first location of a space comprising objects represented by geometry;
splitting a respective object in the space that straddles the first splitting plane into a first portion and a second portion, wherein the first portion is a new object that contains parts of the respective object that lie on a first side of the first splitting plane and the second portion is a different new object that contains parts of the respective object that lie on a second side of the first splitting plane;

constructing a first level of an accelerated data structure that includes a first node and a second node, wherein the first node includes the first portion of the respective object that straddles the first splitting plane and the second node includes the second portion of the respective objects that straddle the first splitting plane;

after constructing the first level of the accelerated data structure, generating a second splitting plane at a second location, different from the first location of the space;

constructing a second level of the accelerated data structure by applying the second splitting plane to respective objects contained in the first node and the second node; and rendering the objects using the accelerated data structure.

* * * * *